United States Patent [19]

Zenitani

[11] 4,107,538
[45] Aug. 15, 1978

[54] CASSETTE FOR PORTABLE X-RAY CAMERA

[75] Inventor: Toshio Zenitani, Nara, Japan

[73] Assignees: International Med-Electronics, Inc., San Mateo, Calif.; Heiwa Electronic Industrial Co., Japan

[21] Appl. No.: 748,435

[22] Filed: Dec. 8, 1976

[51] Int. Cl.² ............................................. G03B 41/16
[52] U.S. Cl. ..................................... 250/480; 250/477
[58] Field of Search ............... 250/475, 480, 481, 482, 250/477

[56] References Cited

U.S. PATENT DOCUMENTS

| | | | |
|---|---|---|---|
| 3,462,599 | 8/1969 | Erikson | 250/477 |
| 3,930,165 | 12/1975 | Robinson | 250/480 |

*Primary Examiner*—Craig E. Church
*Attorney, Agent, or Firm*—Townsend and Townsend

[57] ABSTRACT

A cassette including a light-tight housing having a pair of opposed sidewalls and an open end for insertion of a film into the space between the sidewalls. One of the sidewalls has an opening therethrough and the opening is surrounded by a first frame whose outer margin is covered by a panel opaque to visible light but transparent to X-rays. A second frame is disposed within the first frame and is provided with an illumination screen on its inner margin. The first and second frames have slots in the sides thereof for receiving pins on an actuator member which partially embraces the first frame, the slots in the second frame being inclined so that the illumination screen will move into and out of a position contiguous to the film in the space between the sidewalls when the actuator member moves back and forth longitudinally of the one sidewall relative to the first frame.

12 Claims, 3 Drawing Figures

CASSETTE FOR PORTABLE X-RAY CAMERA

This invention relates to improvements in film cassettes for X-ray machines and, more particularly, to a cassette for a portable X-ray camera.

BACKGROUND OF THE INVENTION

Portable X-ray cameras have recently become of interest to medical practitioners and others to permit movement of X-ray equipment to locations which have otherwise been unreachable with relatively large conventional X-ray machines. Portable X-ray cameras are also important when fast results are desired while minimizing equipment costs.

It has been suggested that a self-developing film be used with a portable X-ray camera so that X-ray photographs can be obtained in a matter of seconds or minutes after an X-ray exposure has been made even if the exposure was made far from conventional film developing facilities. This would permit substantially no waiting time after the exposure to view the resulting X-ray photograph so that immediate steps can be taken as a result of the information derived from the X-ray photograph itself. Thus, a need has arisen for a cassette for holding a film pack of the self-contained type so that the film of the pack can be exposed and immediately thereafter developed in the package for almost immediate viewing after the developing period has elapsed.

SUMMARY OF THE INVENTION

The present invention is directed to a cassette which satisfies the foregoing need by providing a light-tight housing having a pair of spaced sidewalls and an open end to permit a film pack of the self-developing type to be inserted into the space between the sidewalls so that the film of the pack can be exposed by X-rays entering the housing in a manner described hereinafter. Thus, an exposed film ready for viewing can be obtained in a very short time, thereby eliminating the many time-consuming steps required when using conventional film exposure and developing techniques.

One of the sidewalls of the housing has an opening therethrough surrounded by a first frame. The outer margin of the first frame is covered with a panel opaque to visible light but transparent to X-rays. A second frame within the first frame carries an illumination screen at its inner margin. This screen is to be placed adjacent to the film and to be excited by the X-rays to provide the light necessary to adequately expose the X-ray film. Moreover, the proximity of the screen is important to the X-ray film to minimize diffusion and to provide sharp images on the film when the same is developed.

The first and second frames have aligned slots therein for receiving pins on an actuator member which partially embraces the outer, first frame. The slots of the inner frame are inclined relative to the slots of the outer frame so that, when the actuator member moves laterally, i.e., longitudinally of the one sidewall, the inner frame moves perpendicular to the one sidewall, thereby moving the illumination screen into the position contiguous to or in substantial contact with the emulsion side of the film in the space between the sidewalls. Thus, when X-rays are generated, they pass through the object to be investigated, then into the housing to excite the illumination screen and thereby to generate the necessary light to expose the film. Following the film exposure, the illumination screen can be moved away from the film by shifting the actuator member in the opposite direction, whereupon the film can be immediately self-developed in a manner known to the photographic arts.

The primary object of this invention is to provide an improved cassette for receiving a self-developing film pack wherein the cassette has means for shifting an illumination screen into a position contiguous with or in contact with the film to be exposed whereby the cassette is suitable for taking X-ray photographs and providing sharp images on the film by virtue of the proximity of the illumination screen relative to the film to minimize diffusion.

Another object of this invention is to provide a cassette of the type described, wherein the cassette includes a housing having first and second frames on one sidewall thereof, one of the frame having the illumination screen thereon and movable relative to the other frame, whereby the first frame can move into and out of the housing and thereby move the illumination screen into and out of a position adjacent to the film merely by shifting an actuator member a relatively short distance along the one sidewall.

Other objects of this invention will become apparent as the following specification progresses, reference being had to the accompanying drawings for an illustration of the invention.

Figure 1:
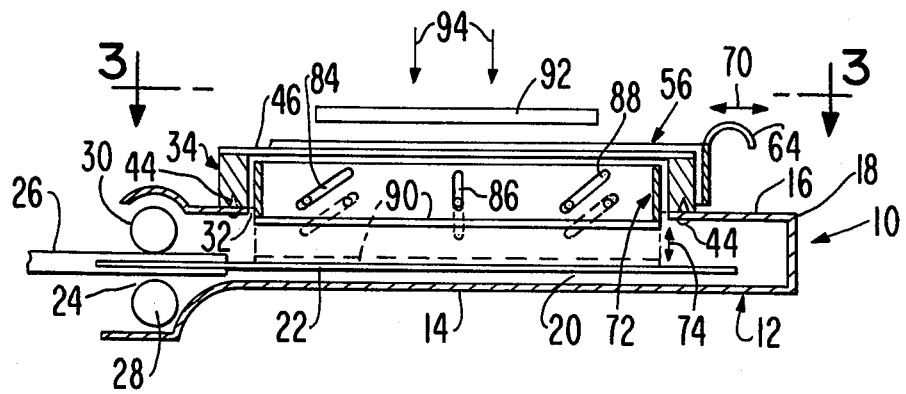
FIG. 1 is a cross-sectional view through the cassette for a portable X-ray camera of this invention.

The cassette of this invention is broadly denoted by the numeral 10 and includes a light-tight housing 12 having a pair of spaced opposed, flat sidewalls 14 and 16, a number of spaced end walls including end wall 18 interconnecting aligned, respective extremities of sidewalls 14 and 16. The sidewalls and end walls define a space 20 for receiving a sheet of X-ray film 22 when the latter is inserted through an open end 24 of the housing opposite to end wall 18. Structure (not shown) is provided to prevent light from enter space through open end 24.

Film 22 is typically Polaroid film initially contained in a package 26 provided with suitable developing materials and first inserted into space 20 along with package 26, following which film 22 is releasably held in space 20 while package 26 is withdrawn from the space to a location such as that shown in FIG. 1, whereupon exposure of the film can be effected. Then, package 26 is reinserted over the exposed film, and the package and the film are withdrawn from space 20 as a unit after a pair of spaced rollers 28 and 30 carried by housing 12 near open end 24 are moved relative to and toward each other so as to apply pressure to the package and activate the developing materials carried thereby. After a predetermined period of time, the film can be removed from the package and it will have a photographic image thereon for viewing purposes.

Sidewall 16 has a rectangular opening 32 therethrough. This opening is surrounded by a first, rectangular, open frame 34 having a pair of opposed flat sides 36 and 38 and a pair of opposed flat ends 40 and 42. The sides and ends of frame 34 are secured by fasteners 44, such as screws, to sidewall 16 of housing 12 in the manner shown in FIG. 1. The outer margin of the frame is covered by a panel 46 of suitable material, such as aluminum, which is opaque to visible light but transparent to X-rays.

Sides 36 and 38 have longitudinally extending slots 48 and 50 extending therethrough near the margin of the frame adjacent to opening 32. Slots 48 are aligned with each other; similarly, slots 50 are aligned with each other. Also, a pair of axially aligned pins 52 and 54 project inwardly from the inner surfaces of respective sides 36 and 38. Pins 52 and 54 are aligned with and disposed substantially midway between respective slots 48 and 50.

A U-shaped member 56 has a pair of spaced, flat sides 58 and 60 and an end 62 interconnecting sides 58 and 60. A handle 64 is carried by end 62. Each of sides 58 and 60 have a pair of spaced pins 66 and 68 which project inwardly from the inner surfaces of sides 58 and 60, pins 66 being axially aligned with each other and pins 68 being axially aligned with each other.

Figure 2:
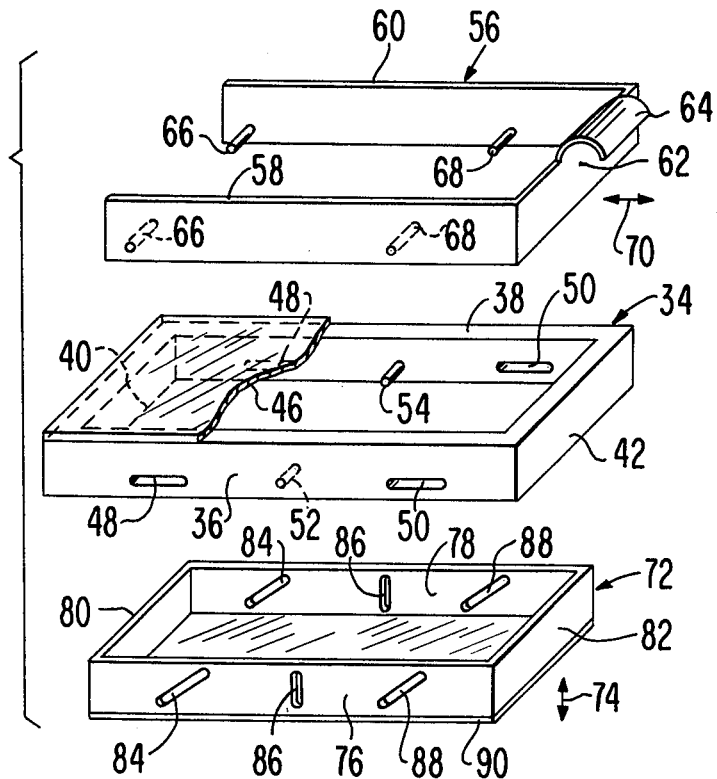
FIG. 2 is an exploded, perspective view of the three parts added to a conventional portable film cassette to render it suitable for use with a portable X-ray camera.
Figure 3:
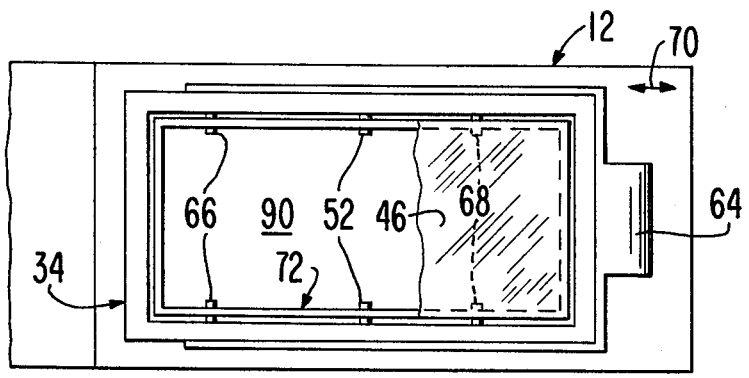
FIG. 3 is a top plan view of the cassette looking in the direction of line 3—3 of FIG. 1.

Sides 58 and 60 of member 56 extend along and are contiguous with the outer surfaces of respective sides 36 and 38 of frame 34 as shown in FIG. 3. In effect, sides 58 and 60 are slidable along sides 36 and 38. Pins 66 extend through slots 48, and pins 68 extend through slots 50. The configurations of the slots permit member 56 to move back and forth relative to frame 34 in the direction of opposed arrows 70 (FIGS. 1–3) and generally parallel to the plane of sidewall 16 of housing 12.

A second rectangular, open frame 72 is disposed at least partially within frame 34 and is coupled with pins 66 and 68 so that the second frame moves in and out of frame 34 along a path generally perpendicular to the plane of sidewall 16 in the direction of opposed arrows 74 (FIGS. 1 and 2) as member 56 moves in the direction of arrows 70. To this end, frame 72 has a pair of opposed flat sides 76 and 78 and a pair of flat ends 80 and 82. Each of sides 76 and 78 has a first, inclined slot 84, a second vertical slot 86, and a third inclined slot 88. In effect, sides 58 and 60 are slidable along sides 36 and 38. The distances between sides 76 and 78 and between ends 80 and 82 are such that frame 72 can fit within and move relative to frame 34 as shown in FIG. 3.

With frame 72 within frame 34, and with member 56 embracing frame 34, the inner ends of pins 66 and 68 extend into and through respective inclined slots 84 and 88. Pins 52 and 54 extend into and through slots 86. Thus, the inclination of slots 84 and 88 assures movement of frame 72 in a direction perpendicular to the direction of movement of member 56 when the latter is shifted relative to frame 34.

An intensifying screen 90 is secured to frame 72 at the margin thereof adjacent to opening 32 as shown in FIG. 1. The purpose of screen 90 is to contact the emulsion side of film 22 as shown in FIG. 1 so that incoming X-rays striking the illumination screen will excite the latter to create light for exposing film 22 in accordance with the image of the object to be X-rayed. The illumination screen is to be in contact with the film to minimize diffusion of the light and to provide for sharp images on the film. However, the illumination screen must be movable away from the film to permit removal of the film and insertion of a new film after a certain exposure of the old film.

In use, cassette 10 is moved to a location at which X-rays are to be taken of a particular object, such as a part of the human body. The object will, for instance, be in the location denoted by the numeral 92 and incoming X-rays are represented by the arrows 94. Before the X-rays are generated, a package 26 containing film 22 is inserted into space 20 through opening 24 whereupon the film 22 is captured in a conventional manner and package 26 is removed to the location shown in FIG. 1. Then, member 56 is manually moved to the right when viewing FIGS. 1 and 3 by pulling on handle 64, causing frame 72 to move inwardly of housing 12 and into the dashed line position of FIG. 1 relative to frame 34. This causes screen 90 to move into substantial contact with the emulsion side of film 22, following which the X-rays are generated and pass through the object at location 92. The X-rays strike screen 90 causing it to fluoresce and the resulting light immediately strikes the emulsion of the film since the film is in contact with screen 90. As soon as the X-ray exposure has been completed, member 56 is moved to the left when viewing FIGS. 1 and 3, causing frame 72 and screen 90 to move back into the full-line position of FIG. 1, whereupon package 26 can be reinserted into space 20 to become coupled with film 22, following which development of the film can be effected by moving rollers 28 and 30 relative to and toward each other to activate the developing material in package 26 when the latter is pulled out of housing 12.

The teachings of the present invention can be used with a conventional Polaroid film cassette. To this end, the cassette can be provided with opening 32, and frames 34 and 72 and member 56 can be mounted on the sidewall as described above.

I claim:

1. A cassette for use with a portable X-ray machine comprising a light-tight housing having a film-receiving space therewithin and an open end for permitting insertion of a photographic film in the space, said housing having a pair of opposed sidewalls, one of the sidewalls having an opening therethrough; an illumination screen; means coupled to said one sidewall and moveable at least partially through the opening for mounting the screen for movement along a path into and out of a position contiguous to a film in the space; and means coupled with said mounting means for moving said screen along said path into and out of said position.

2. A cassette as set forth in claim 1, wherein said path extends generally perpendicular to the said one sidewall.

3. A cassette as set forth in claim 2, wherein said moving means includes a member movable along a path extending longitudinally of said one sidewall.

4. A cassette as set forth in claim 1, wherein is included a frame having an inner margin and an outer margin, the screen being carried by the frame at the inner margin thereof, said frame being coupled to said mounting means and movable relative to the housing.

5. A cassette as set forth in claim 4, wherein said mounting means includes a second frame, the first frame being at least partially received within the second frame and movable in a direction outwardly thereof as the screen moves toward said position.

6. A cassette as set forth in claim 5, wherein said second frame has an outer margin and an inner margin, the inner margin being secured to the housing in surrounding relationship to said opening in said one sidewall, the outer margin of the second frame having a panel thereon transparent to X-rays and opaque to visible light.

7. A cassette as set forth in claim 5, wherein each of said frames has a pair of opposed sides, each side of the first frame having a pair of spaced, inclined slots, each side of the second frame having a pair of spaced slots extending longitudinally of said one sidewall, there being a slot of the second frame aligned with a respective slot of the first frame, said moving means including pin structure extending into each pair of aligned slots of the first and second frames, respectively, said pin structure being movable longitudinally of the slots of the second frame.

8. A cassette as set forth in claim 7, wherein said moving means includes a member having a pair of opposed sides, each side having a pair of spaced pins defining said pin structure, the pins extending inwardly from the inner surfaces of the sides of the member and extending into respective slots of the first and second frames.

9. A cassette as set forth in claim 8, wherein the sides of the member are contiguous to and movable along the outer surfaces of the sides of the second frame.

10. A cassette as set forth in claim 9, wherein the sides of the member are of substantially the same width as the sides of the second frame, the first frame being movable through the opening in said one sidewall.

11. A cassette as set forth in claim 9, wherein each side of the first frame has a slot extending perpendicular to the slots of the second frame and disposed midway between the inclined slots thereof, each side of the second frame having a pin extending into the middle slot on the corresponding side of the first frame.

12. A cassette for use with a portable X-ray machine comprising: a housing having a pair of opposed sidewalls, an opening through one of the sidewalls, an open end, and a space between the sidewalls for receiving a film movable into the housing through said open end; a first frame secured to said one sidewall and surrounding said opening, said first frame having a pair of opposed sides, each side of the first frame having a pair of spaced, aligned slots extending longitudinally of said one sidewall of the housing; a panel secured to the outer margin of the first frame in covering relationship thereto, said panel being opaque to visible light and transparent to X-rays; a second frame disposed at least partially within the first frame and having an inner margin, the second frame having a pair of opposed sides extending along and adjacent to respective sides of the first frame, each side of the second frame having a pair of inclined slots, there being an inclined slot aligned with each slot in the respective side of the first frame; an illumination screen secured to the inner margin of the second frame; and a U-shaped member at least partially embracing the first frame and movable relative thereto in a direction longitudinally of said one sidewall, the member having a pin for each slot of the first frame, respectively, each pin extending through respective, aligned slots in the first and second frames, whereby said second frame and thereby said illumination screen is moved into and out of a position substantially contiguous to a film in said space as the member moves back and forth relative to said frame.

* * * * *